(12) United States Patent
Banning et al.

(10) Patent No.: US 9,309,410 B2
(45) Date of Patent: *Apr. 12, 2016

(54) COLORANT COMPOUNDS

(71) Applicant: Xerox Corporation, Norwalk, CT (US)

(72) Inventors: Jeffery H. Banning, Hillsboro, OR (US); Bo Wu, Wilsonville, OR (US); Nathan G. Starr, Ashland, OR (US); Stephan V. Drappel, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/011,762

(22) Filed: Aug. 28, 2013

(65) Prior Publication Data

US 2015/0065697 A1    Mar. 5, 2015

(51) Int. Cl.
*C09B 31/14* (2006.01)

(52) U.S. Cl.
CPC .................... *C09B 31/14* (2013.01)

(58) Field of Classification Search
CPC .......................................... C09B 31/14
See application file for complete search history.

(56) References Cited

U.S. PATENT DOCUMENTS

| | | | | |
|---|---|---|---|---|
| 5,589,100 A * | 12/1996 | Grasso | .................. | C07C 211/58 252/299.01 |
| 8,884,012 B1 | 11/2014 | Banning et al. | | |
| 2012/0090502 A1* | 4/2012 | Chao | ........................ | C09B 31/14 106/31.48 |
| 2015/0056420 A1 | 2/2015 | Banning et al. | | |
| 2015/0057394 A1 | 2/2015 | Banning et al. | | |
| 2015/0065620 A1* | 3/2015 | Banning et al. | .................. | 524/89 |

OTHER PUBLICATIONS

Pfüller et al., "Sudan Black B: Chemical Structure and Histochemistry of the Blue Main COmponents," Histochemistry 54, 237-250 (1977).

* cited by examiner

*Primary Examiner* — Joseph Kosack

(57) ABSTRACT

Disclosed is a compound of the formula

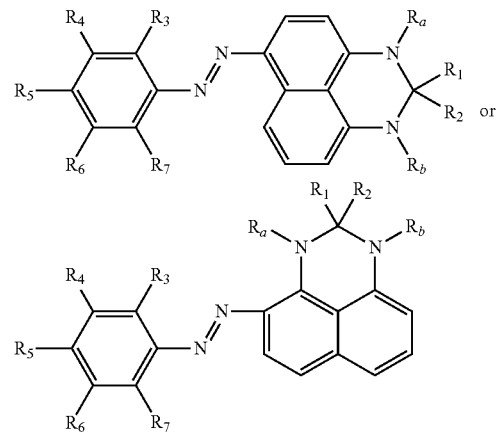

wherein $R_a$ and $R_b$ each, independently of the other, are hydrogen, alkyl, aryl, arylalkyl, or alkylaryl, $R_1$ and $R_2$ each, independently of the other, are hydrogen, alkyl, aryl, arylalkyl, or alkylaryl, provided that at least one of $R_1$ and $R_2$ is other than hydrogen, and $R_3$, $R_4$, $R_5$, $R_6$, and $R_7$ each, independently of the others, are alkyl, aryl, arylalkyl, alkylaryl, or a substituent other than hydrogen, alkyl, aryl, arylalkyl, or alkylaryl, wherein in each case alkyl, aryl, arylalkyl, or alkylaryl may or may not be substituted and may or may not have hetero atoms therein, and wherein two or more of $R_3$, $R_4$, $R_5$, $R_6$, and $R_7$ can be joined together to form a ring.

17 Claims, 2 Drawing Sheets

COLORANT COMPOUNDS

CROSS-REFERENCE TO RELATED APPLICATIONS

Reference is made to U.S. Pat. No. 9,228,097, filed concurrently herewith, entitled "Phase Change Inks," with the named inventors Jeffery H. Banning, Bo Wu, Nathan G. Starr, and Stephan V. Drappel, the disclosure of which is totally incorporated herein by reference.

Reference is made to U.S. Pat. No. 8,884,012, filed concurrently herewith, entitled "Dye Compound and Method of Making the Compound," with the named inventors Jeffrey H. Banning, Bo Wu, Nathan Starr, and Stephan V. Drappel, the disclosure of which is totally incorporated herein by reference.

Reference is made to U.S. Pat. No. 9,193,869, filed concurrently herewith, entitled "Dye Compounds, Method of Making the Compounds and Ink Composition Employing the Compounds," with the named inventors Jeffrey H. Banning, Jule W. Thomas, Jr., Bo Wu, and Stephan V. Drappel, the disclosure of which is totally incorporated herein by reference.

Reference is made to U.S. application Ser. No. 13/975,933, now Publication No. 2015-0056420 filed concurrently herewith, entitled "Phase Change Inks Containing Wax-Soluble Near-Infrared Dyes," with the named inventors Jeffrey H. Banning, Jule W. Thomas, Jr., Bo Wu, and Stephan V. Drappel, the disclosure of which is totally incorporated herein by reference.

BACKGROUND

Disclosed herein are colorant compounds. More specifically, disclosed herein are colorant compounds particularly suitable for use in hot melt or phase change inks.

Many known colorant compounds are not soluble in phase change ink carriers. Further, pigment colorants, which are generally particulate in nature, as opposed to dye colorants, which are soluble in a selected carrier at the molecular level, can exhibit disadvantages such as settling of the pigment within the ink carrier, leading to difficulties such as clogging of the ink jet printhead. Accordingly, metal-free dye-based colorants that are soluble in phase change ink carriers continue to be desirable.

SUMMARY

Disclosed herein is a compound of the formula

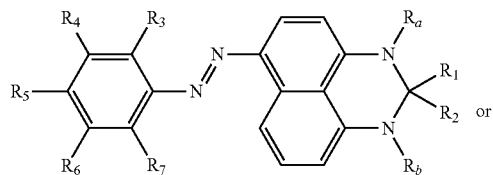

or

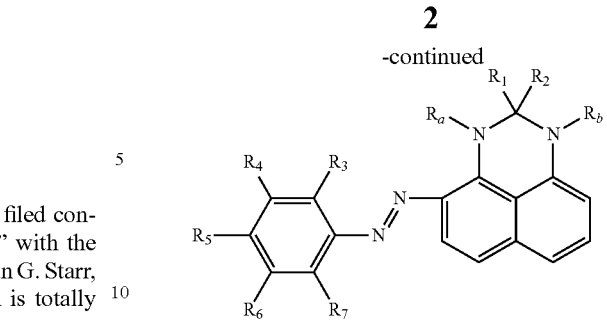

wherein: (a) $R_a$ and $R_b$ each, independently of the other, are: (i) hydrogen; (ii) alkyl, including substituted and unsubstituted alkyl, wherein hetero atoms may optionally be present in alkyl; (iii) aryl, including substituted and unsubstituted aryl, wherein hetero atoms may optionally be present in aryl; (iv) arylalkyl, including substituted and unsubstituted arylalkyl, wherein hetero atoms may optionally be present in either the aryl or the alkyl portion of arylalkyl; or (v) alkylaryl, including substituted and unsubstituted alkylaryl, wherein hetero atoms may optionally be present in either the aryl or the alkyl portion of alkylaryl; (b) $R_1$ and $R_2$ each, independently of the other, are: (i) hydrogen, provided that at least one of $R_1$ and $R_2$ is other than hydrogen; (ii) alkyl, including substituted and unsubstituted alkyl, wherein hetero atoms may optionally be present in alkyl, provided that when $R_1$ and $R_2$ are both alkyl at least one of $R_1$ and $R_2$ has at least about 6 carbons; (iii) aryl, including substituted and unsubstituted aryl, wherein hetero atoms may optionally be present in aryl; (iv) arylalkyl, including substituted and unsubstituted arylalkyl, wherein hetero atoms may optionally be present in either the aryl or the alkyl portion of arylalkyl; or (v) alkylaryl, including substituted and unsubstituted alkylaryl, wherein hetero atoms may optionally be present in either the aryl or the alkyl portion of alkylaryl; (c) $R_3$, $R_4$, $R_5$, $R_6$, and $R_7$ each, independently of the others, are: (1) alkyl, including substituted and unsubstituted alkyl, wherein hetero atoms may optionally be present in alkyl; (2) aryl, including substituted and unsubstituted aryl, wherein hetero atoms may optionally be present in aryl; (3) arylalkyl, including substituted and unsubstituted arylalkyl, wherein hetero atoms may optionally be present in either the aryl or the alkyl portion of arylalkyl; (4) alkylaryl, including substituted and unsubstituted alkylaryl, wherein hetero atoms may optionally be present in either the aryl or the alkyl portion of alkylaryl; or (5) a substituent other than hydrogen, alkyl, aryl, arylalkyl, or alkylaryl; wherein two or more of $R_3$, $R_4$, $R_5$, $R_6$, and $R_7$ can be joined together to form a ring.

DETAILED DESCRIPTION

Figure 1:
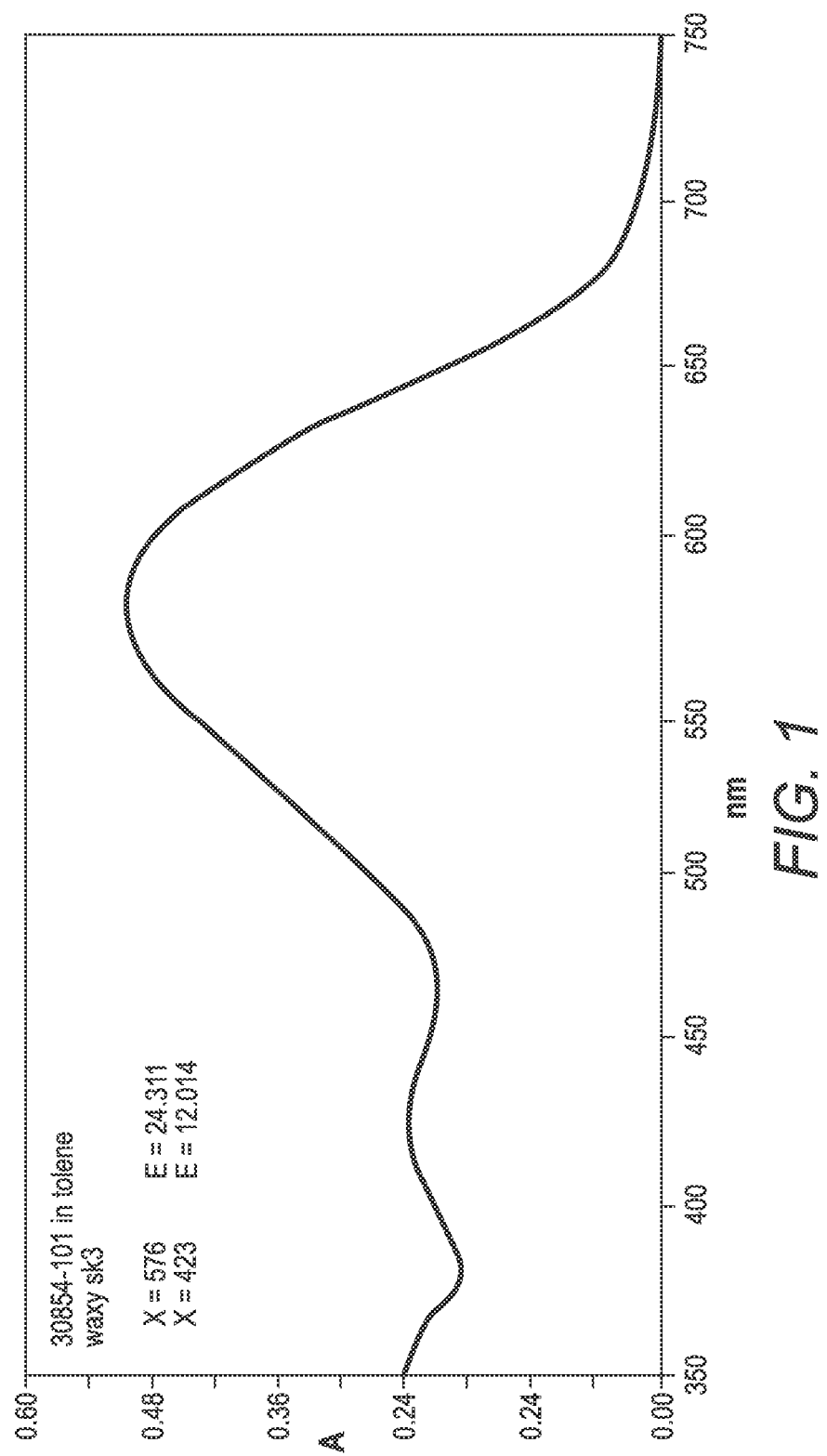
FIG. 1 is a UV-visible spectrum of the material prepared in Example I, Part B.

The colorants disclosed herein are of the formulae

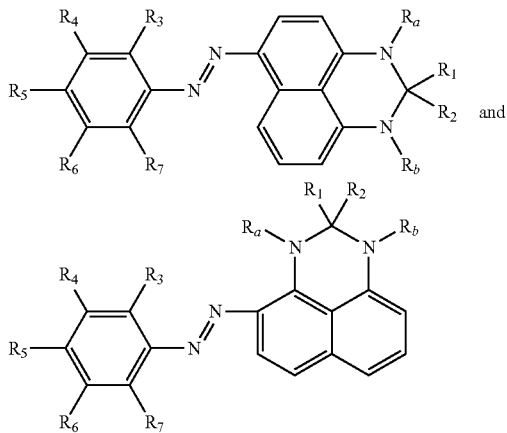

wherein:
(a) $R_a$ and $R_b$ each, independently of the other, are:
(i) hydrogen;
(ii) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 1 carbon, in another embodiment with at least about 6 carbons, in yet another embodiment with at least about 12 carbons, and in still another embodiment with at least about 16 carbons, and in one embodiment with no more than about 100 carbons, in another embodiment with no more than about 50 carbons, and in yet another embodiment with no more than about 18 carbons;
(iii) aryl, including substituted and unsubstituted aryl, wherein hetero atoms, such as oxygen, nitrogen, sulfur, silicon, phosphorus, boron, or the like, may optionally be present in aryl, in one embodiment with at least about 4 carbons, in another embodiment with at least about 5 carbons, and in yet another embodiment with at least about 6 carbons, and in one embodiment with no more than about 24 carbons, in another embodiment with no more than about 18 carbons, and in yet another embodiment with no more than about 12 carbons;
(iv) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 5 carbons, in another embodiment with at least about 6 carbons, and in yet another embodiment at least about 7 carbons, and in one embodiment no more than about 100 carbons, in another embodiment no more than about 50 carbons, and in yet another embodiment no more than about 18 carbons, such as benzyl or the like; or
alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 5 carbons, in another embodiment with at least about 6 carbons, and in yet another embodiment at least about 7 carbons, and in one embodiment no more than about 100 carbons, in another embodiment no more than about 50 carbons, and in yet another embodiment no more than about 18 carbons, such as tolyl or the like;
(b) $R_1$ and $R_2$ each, independently of the other, are:
(i) hydrogen, provided that at least one of $R_1$ and $R_2$ is other than hydrogen;
(ii) alkyl, including substituted and unsubstituted alkyl, wherein hetero atoms, such as oxygen, nitrogen, sulfur, silicon, phosphorus, boron, or the like, may optionally be present in alkyl, in one embodiment with at least 1 carbon, in another embodiment with at least about 6 carbons, in yet another embodiment with at least about 12 carbons, and in still another embodiment with at least about 16 carbons, and in one embodiment with no more than about 100 carbons, in another embodiment with no more than about 50 carbons, and in yet another embodiment with no more than about 18 carbons, provided that when $R_1$ and $R_2$ are both alkyl at least one of $R_1$ and $R_2$ has in one embodiment at least about 6 carbons, in another embodiment at least about 12 carbons, and in yet another embodiment at least about 16 carbons;
(iii) aryl, including substituted and unsubstituted aryl, wherein hetero atoms, such as oxygen, nitrogen, sulfur, silicon, phosphorus, boron, or the like, may optionally be present in aryl, in one embodiment with at least about 4 carbons, in another embodiment with at least about 5 carbons, and in yet another embodiment with at least about 6 carbons, and in one embodiment with no more than about 24 carbons, in another embodiment with no more than about 18 carbons, and in yet another embodiment with no more than about 12 carbons;
(iv) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 5 carbons, in another embodiment with at least about 6 carbons, and in yet another embodiment at least about 7 carbons, and in one embodiment no more than about 100 carbons, in another embodiment no more than about 50 carbons, and in yet another embodiment no more than about 18 carbons, such as benzyl or the like; or
alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 5 carbons, in another embodiment with at least about 6 carbons, and in yet another embodiment at least about 7 carbons, and in one embodiment no more than about 100 carbons, in another embodiment no more than about 50 carbons, and in yet another embodiment no more than about 18 carbons, such as tolyl or the like; and (c) $R_3$, $R_4$, $R_5$, $R_6$, and $R_7$ each, independently of the others, are:

(1) hydrogen;

(2) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 1 carbon, in another embodiment with at least about 6 carbons, and in yet another embodiment with at least about 12 carbons, and in one embodiment with no more than about 100 carbons, in another embodiment with no more than about 50 carbons, and in yet another embodiment no more than about 18 carbons;

(3) aryl, including substituted and unsubstituted aryl, wherein hetero atoms, such as oxygen, nitrogen, sulfur, silicon, phosphorus, boron, or the like, may optionally be present in aryl, in one embodiment with at least about 4 carbons, in another embodiment with at least about 5 carbons, and in yet another embodiment with at least about 6 carbons, and in one embodiment with no more than about 24 carbons, in another embodiment with no more than about 18 carbons, and in yet another embodiment no more than about 12 carbons;

(4) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 5 carbons, in another embodiment with at least about 6 carbons, and in yet another embodiment with at least about 7 carbons, and in one embodiment with no more than about 100 carbons, in another embodiment with no more than about 50 carbons, and in yet another embodiment no more than about 18 carbons, such as benzyl or the like;

(5) alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 5 carbons, in another embodiment with at least about 6 carbons, and in yet another embodiment with at least about 7 carbons, and in one embodiment with no more than about 100 carbons, in another embodiment with no more than about 50 carbons, and in yet another embodiment no more than about 18 carbons, such as tolyl or the like; or (6) a substituent, examples of which include (A) halogen, including fluorine, chlorine, bromine, and iodine; (B) hydroxy; (C) primary, secondary, and/or tertiary amino; (D) imine; (E) ammonium; (F) pyridine; (G) pyridinium; (H) ether; (I) aldehyde; (J) ketone; (K) ester; (L) amide; (M) carbonyl; (N) thiocarbonyl; (O) sulfate; (P) sulfonate; (Q) sulfonic acid; (R) sulfide; (S) sulfoxide; (T) phosphine; (U) phosphonium; (V) phosphate; (W) phosphonate; (X) nitrile; (Y) mercapto; (Z) nitro; (AA) nitroso; (BB) sulfone; (CC) acyl; (DD) acid anhydride; (EE) azide; (FF) azo; (GG) cyanato; (HH) isocyanato; (II) thiocyanato; (JJ) isothiocyanato; (KK) carboxylate; (LL) carboxylic acid; (MM) urethane (carbamate); (NN) urea (carbamide); (OO) silyl; (PP) siloxyl; (QQ) silane; or the like, as well as combinations or mixtures thereof;

wherein two or more of $R_3$, $R_4$, $R_5$, $R_6$, and $R_7$ can be joined together to form a ring;

wherein examples of the substituents which may or may not be present on the substituted alkyl, aryl, arylalkyl, or alkylaryl groups include the same as those listed as (A) through (QQ) or the like, as well as combinations or mixtures thereof.

For example, when $R_3$, $R_4$, and $R_6$ are hydrogen, $R_7$ is chlorine, and $R_5$ is sulfone linked to methyl, the compound has the formula

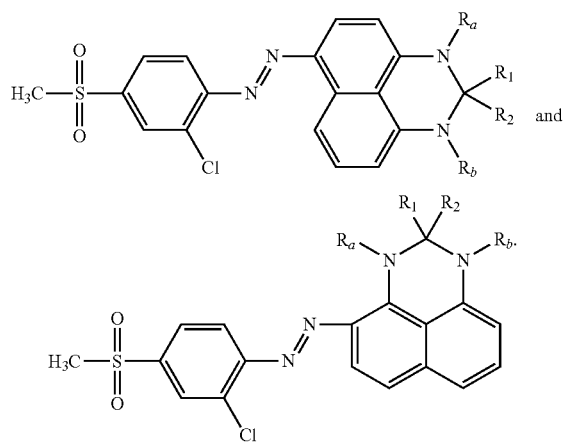

When $R_3$ and $R_4$ are hydrogen, $R_5$ is azo linked to phenyl, and $R_6$ and $R_7$ are linked to form an aromatic ring, the compound has the formula

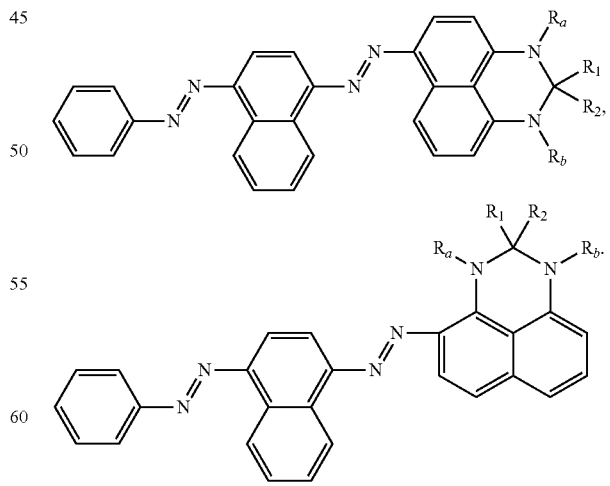

Similarly, when $R_4$ and $R_5$ are hydrogen, $R_3$ is azo linked to phenyl, and $R_6$ and $R_7$ are linked to form an aromatic ring, the compound has the formula

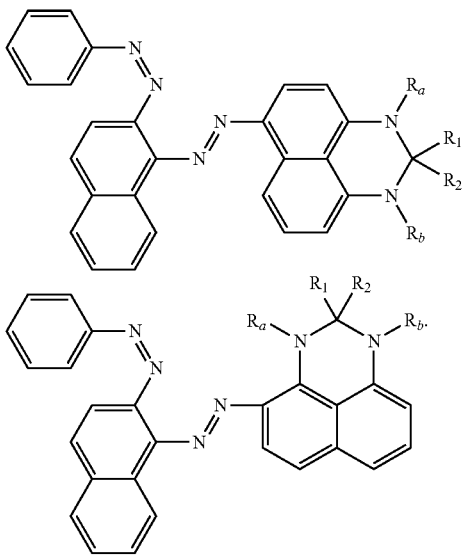

Specific examples of suitable $R_1$ and $R_2$ groups include:

wherein n is from about 8 to about 100, such as

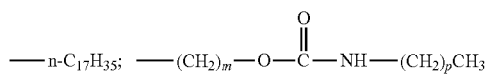

wherein m+p is from about 8 to about 100, such as

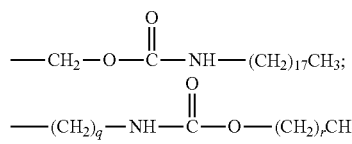

wherein q+r is from about 8 to about 100,

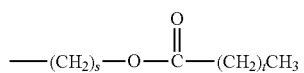

wherein s+t is from about 8 to about 100, such as

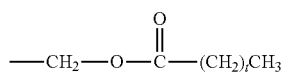

wherein t is 11, 17, 21, 27, 37 or 47;

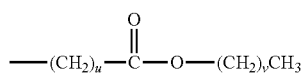

wherein u+v is from about 8 to about 100,

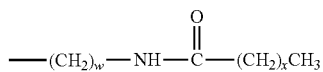

wherein w+x is from about 8 to about 100,

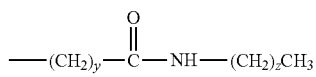

wherein y+z is from about 8 to about 100,

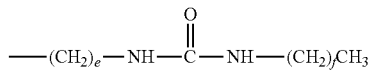

wherein e+f is from about 8 to about 100, or the like, as well as combinations or mixtures thereof.

Compounds having the

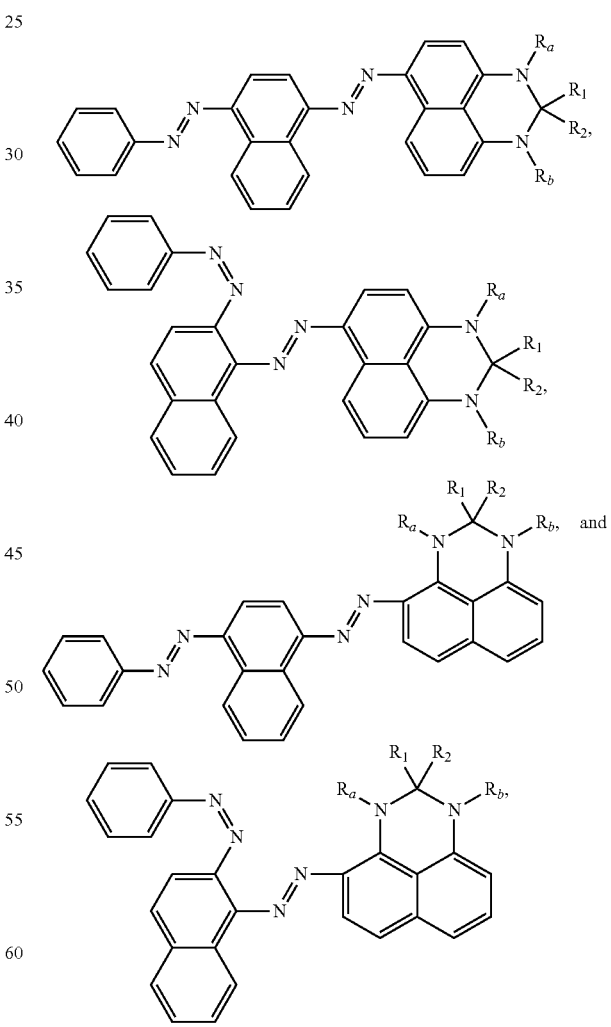

basic structures can be prepared by methods analogous to those disclosed in, for example, U. Pfüller, H. Franz, and A. Preiss, *Histochemistry* 54, 237-250 (1977), the disclosure of which is totally incorporated herein by reference. This method can also be used to prepare analogous compounds of the general generic formulae

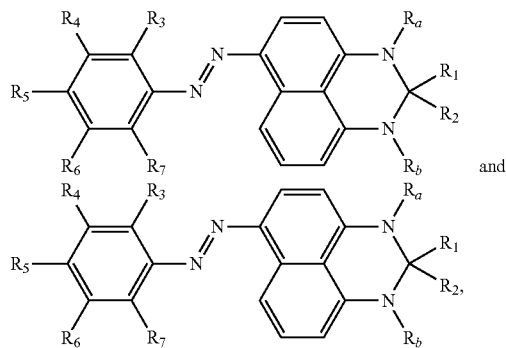

such as compounds of the formulae

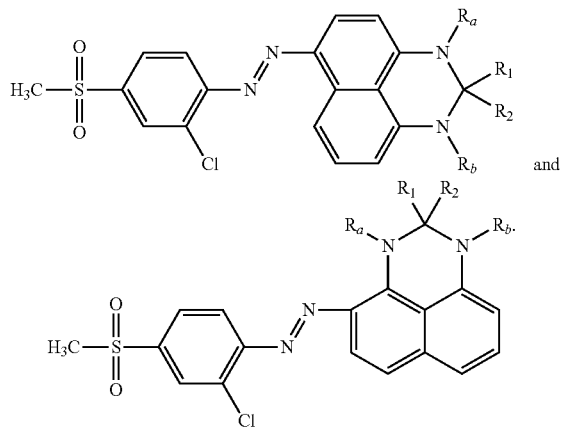

Alternatively, the compounds can be prepared by first obtaining a "coupler" of the formula

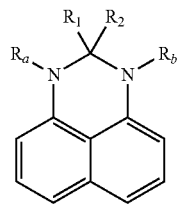

and reacting it with an aromatic amine of the formula

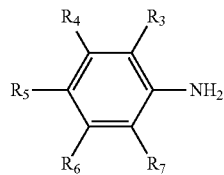

in the presence of nitrous acid or another reagent that generates nitrous acid in situ, such as nitrosylsulfuric acid, a $NO_2^-$ salt (such as $NaNO_2$ or $KNO_2$) in combination with a strong mineral acid (such as HCl or the like), or the like, as follows:

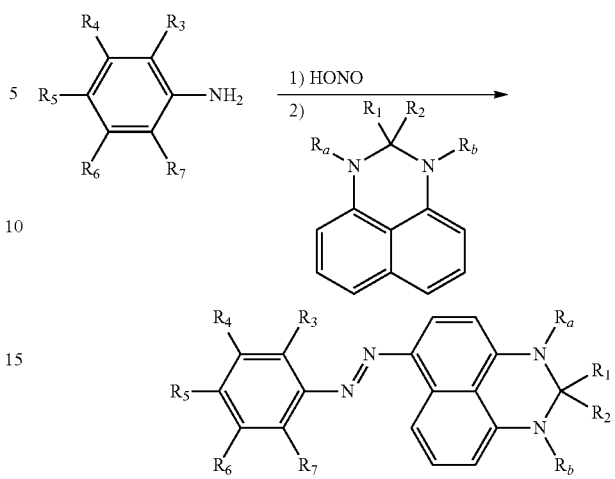

Coupler compounds having the desired $R_1$ and $R_2$ groups can be prepared by reacting 1,8-diaminonaphthalene with the appropriate ketone. For example, the reaction with stearone yields $R_1$ and $R_2$ both being $—(CH_2)_{17}CH_3$:

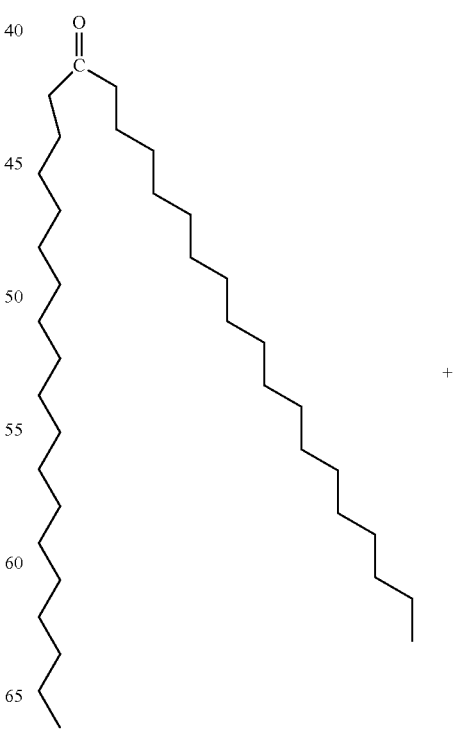

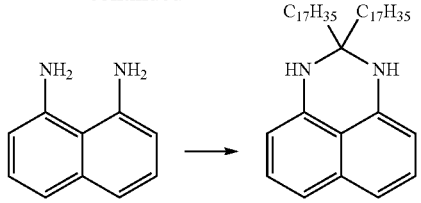

Incorporating functional groups into the ketone allows further reaction of the $R_1$ and $R_2$ groups subsequent to formation of the coupler. For example, when the ketone is dihydroxyacetone, the coupler is of the formula

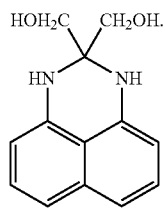

Further reaction of this compound can create acid, ester, amide, carbamate, or like compounds by known methods.

Alternatively, the coupler compound can be prepared by a transesterification process as follows:

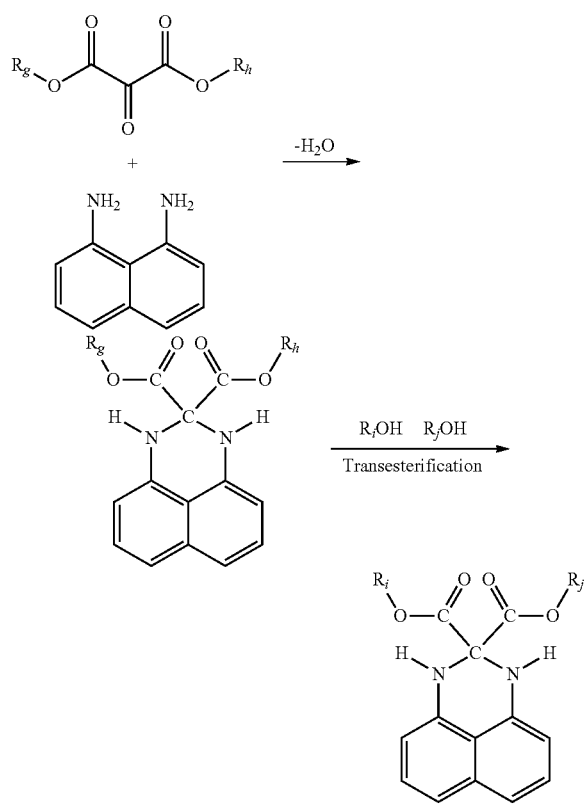

using a simple starting material such as diethyl mesoxalate, available from Aldrich Chemical Co., Milwaukee, Wis.

Specific embodiments will now be described in detail. These examples are intended to be illustrative, and the claims are not limited to the materials, conditions, or process parameters set forth in these embodiments. All parts and percentages are by weight unless otherwise indicated.

Example I

A. Preparation of 2,3-dihydro-2,2-distearylperimidine

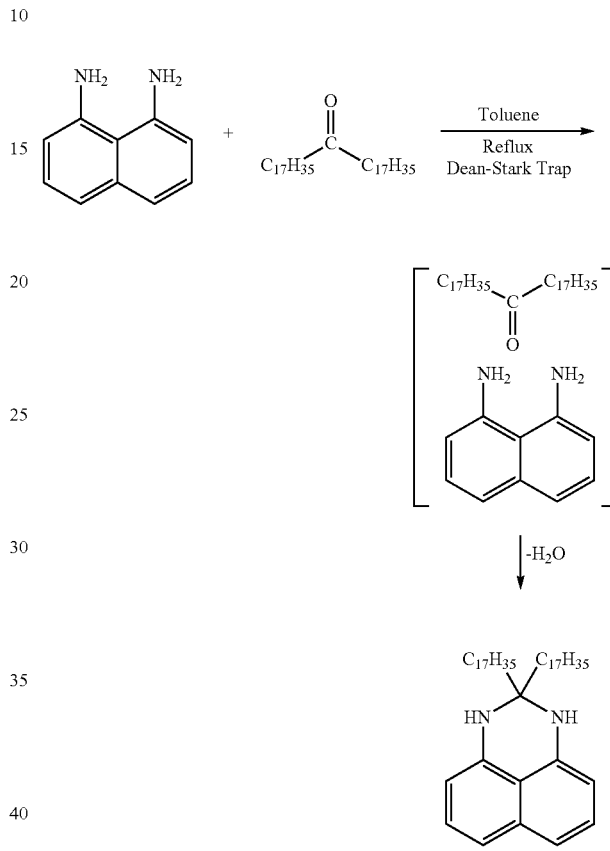

To a 1,000 mL 3-necked 24/40 round-bottom flask with stoppers on two of the necks, a Dean-Stark trap with condenser on the center neck, and a TEFLON coated stir magnet was charged 80 g stearone (obtained from Witco Chemical Co.), 27.5 g 1,8-diaminonaphthalene (purified following the procedure of H. O. House et al., *J. Org Chem.* 1972, 37 7, p. 1003), representing a slight excess), 0.1 g p-toluene sulfonic acid (obtained from Aldrich Chemical Co.), and 170 g toluene. The reaction vessel was placed in a 130° C. silicone oil bath and allowed to reflux for 16 h. Water was collected with toluene in the DS-trap. Thin Layer Chromatography (normal phase silica with toluene as the mobile phase) was then run on the reaction product. No starting stearone was observed, but some 1,8-diaminonaphthalene was observed as it was run in excess. The reaction mixture was then poured into a 1 L beaker with 400 mL methanol and allowed to stir. The solid product was then collected via vacuum filtration and a Buchner funnel and the solid collected was allowed to dry. TLC (normal phase silica with toluene as the mobile phase) was then run on the purified product and no stearone or 1,8-diaminonaphthalene were observed. An IR spectrum of the product was run and the peaks corresponded to 2,3-dihydro-2,2-distearylperimidine.

B. Dye Preparation

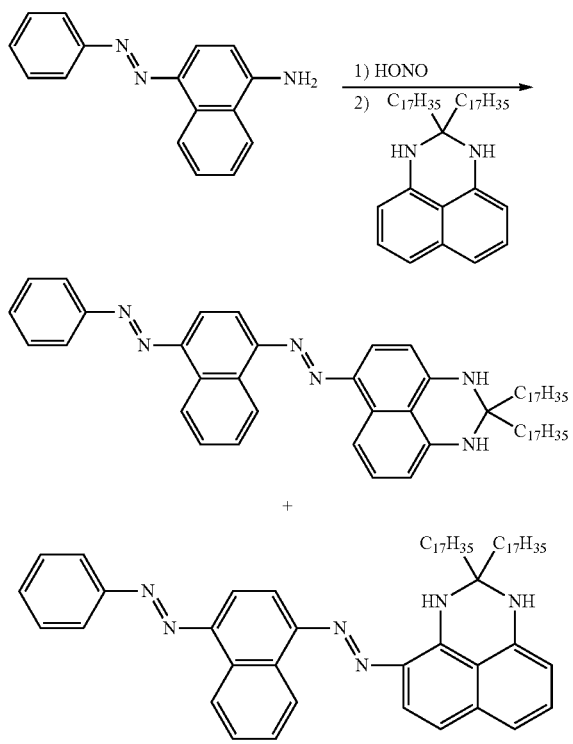

To a 250 mL beaker equipped with a TEFLON coated stir magnet was charged 130 g of a mixture of 5 parts acidic acid and 1 part propionic acid, 1.74 g concentrated HCl, and 5 g 4-phenylazo-1-naphthylamine HCl (obtained from Aldrich Chemical Co.). The reaction mixture was stirred at room temperature for 20 min. The contents turned purple and the solid did not totally dissolve. The beaker was then chilled in an ice/salt bath to 0-5° C. More solids came out upon cooling and the content became thick. With hand stirring, 1.33 g sodium nitrite/15 mL water solution was added dropwise. No exotherm was observed but the contents turned yellow and all solids dissolved. A PMA test to determine if excess $NO^+$ has been killed off before coupling (as described in U.S. Pat. No. 7,812,140, the disclosure of which is totally incorporated herein by reference) was done after one hour of stirring at 0-5° C., which was positive. Then the cold diazonium salt solution was slowly poured into the 250 mL beaker containing 11.2 g of the waxy perimidine coupler prepared as described in Part A above and 90 g THF. A dark blue precipitate began to form, eventually resulting in a sticky solid clump. The brown liquid was decanted and discarded. The clumpy solids were dissolved in 200 mL toluene, transferred to a separatory funnel, and washed three times with water, followed by a single 150 mL water/100 mL methanol wash. The toluene in the top layer was evaporated and dried in a vacuum oven. The spectral strength of the recovered product in toluene was 24311 mlA/g @576 nm, and 12019 mlA/g @423 nm. The UV-visible spectrum of this material, taken on a Perkin Elmer Lambda 2S UV/Vis spectrophotometer, is shown in FIG. 1.

Example II

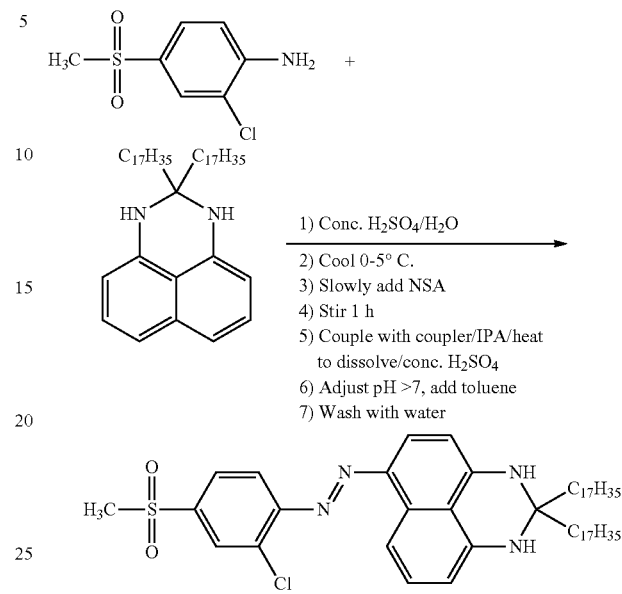

Figure 2:
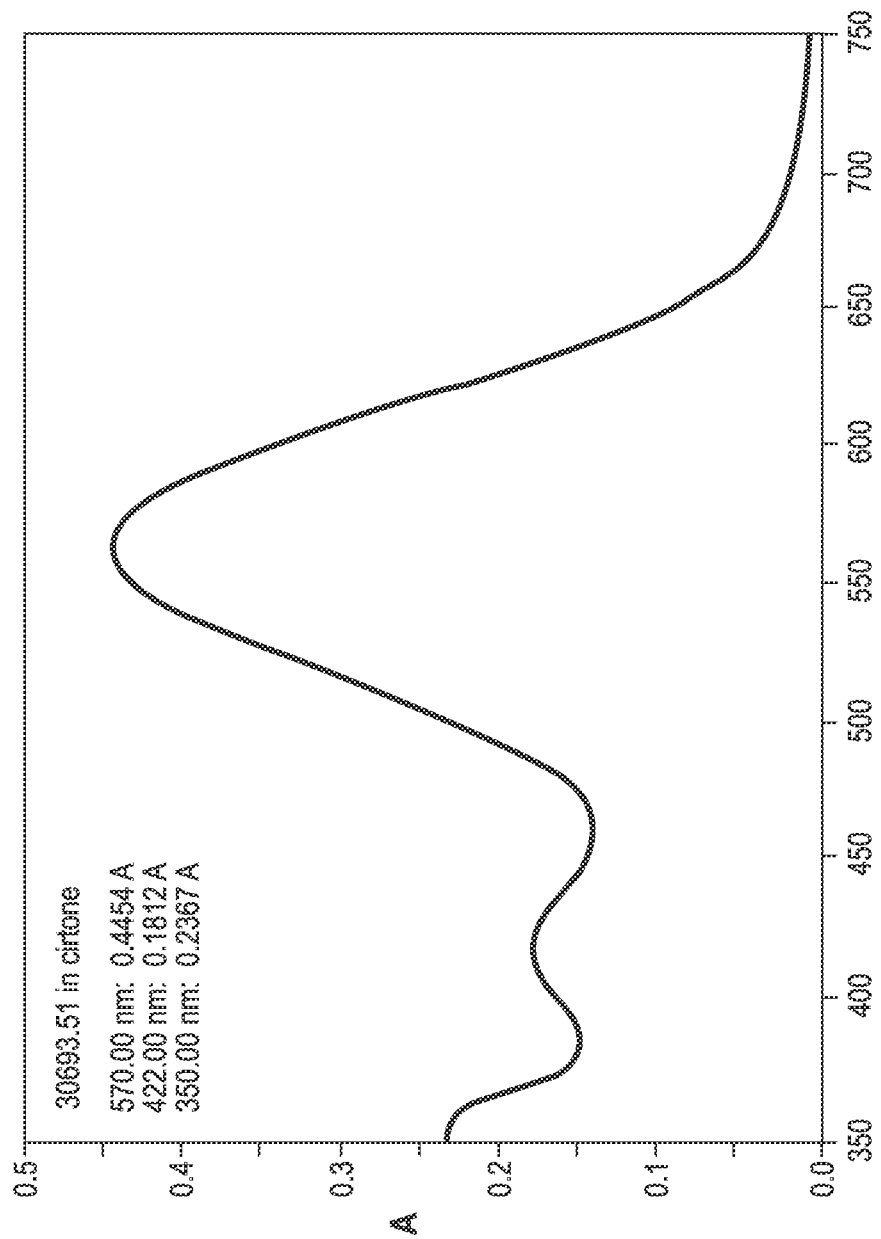
FIG. 2 is a UV-visible spectrum of the material prepared in Example II.

To a 50 mL flask equipped with TEFLON coated magnetic stir was charged 10.6 g water and 8.04 g conc. $H_2SO_4$. With stirring, 3 g 2-chloro-4-(methylsulfonyl) benzamine (CAMSU) (MW=205.5, obtained from Clarient Chemical Corp.) was added and formed a white slurry. The jar was then placed in an ice bath and allowed to cool to 0° C., after which 4.87 g nitrosylsulfuric acid (40% in $H_2SO_4$, MW=127, obtained from Aldrich Chemical Co.) was added slowly to keep T<0° C. The contents turned to a clear yellow solution. To a separate 500 mL beaker was charged 9.4 g of a perimidine coupler prepared as described in Part A of Example I and 70 g isopropanol. The contents dissolved upon heating. Thereafter 3 g conc. $H_2SO_4$ was added. The clear solution in the jar was poured into the perimidine coupler solution. A dark yellow very tacky solid formed. The pH was adjusted >7 by addition of 40% NaOH solution. Then the contents were poured into a separatory funnel. The lower water layer was discarded. Toluene was added to dissolve the top tacky solid layer. Then the red purple toluene layer was washed with 2× water. The solvent was then evaporated and the solid collected. A spectral strength (UV-Vis spectrum) was run on the sample and is shown in FIG. 2. The structure of the sample was believed to be that of the azo-perimidine shown above.

Example III

Part A: Preparation of 2,3-dihydro-2,2-distearylperimidine

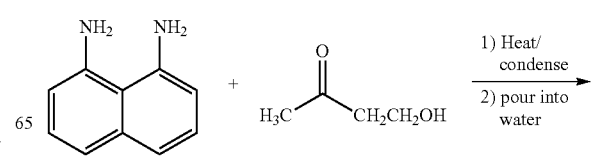

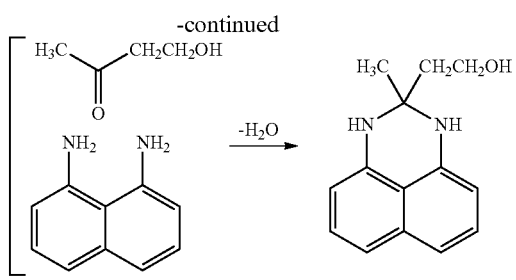

To a 100 mL flask with TEFLON-coated stir magnet was added 33.4 g 4-hydroxy-2-butanone and 20 g 1,8-diaminonaphthalene. The reaction vessel was placed in a silicone oil bath at 70° C. and stirring was initiated. After 3 h a sample was taken and Thin Layer Chromatography (normal phase silica with 90/10 MeOH/toluene mobile phase) was then run on the reaction product, and no starting reactants were observed. The reaction product was poured into a 1 L beaker with 300 mL deionized water. The solids precipitated out and were collected via vacuum filtration in a Buchner funnel and allowed to dry in a vacuum oven. An IR spectrum of the product was run and the peaks corresponded to the expected product 2,3-dihydro-2-methyl-2-hydroxyethylperimidine. About 24.9 g of product were obtained representing 86% yield.

Part B: Dye Preparation

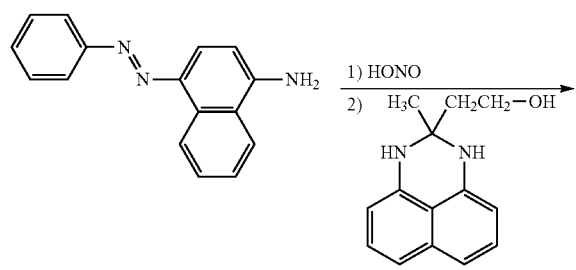

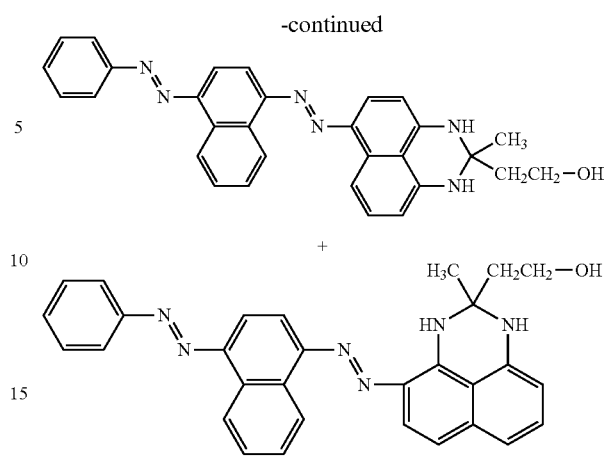

To a 250 mL beaker equipped with a TEFLON coated stir magnet is charged 130 g of a mixture of 5 parts acetic acid and 1 part propionic acid, 1.74 g concentrated HCl, and 5 g 4-phenylazo-1-naphthylamine HCl (obtained from Aldrich Chemical Co.). The reaction mixture is stirred at room temperature for 20 min. The contents turn purple and the solid does not totally dissolve. The beaker is then chilled in an ice/salt bath to 0-5° C. More solids come out upon cooling and the contents become thick. With hand stirring, 1.33 g sodium nitrite/15 mL water solution is added dropwise. No exotherm is observed but the contents turn yellow and all solids dissolve. After one hour of stirring at 0-5° C., the cold diazonium salt solution is slowly poured into the 250 mL beaker containing 11.2 g of the hydroxyl containing perimidine coupler prepared as described in Part A above and 90 g THF. The precipitate that is formed is collected and is dissolved in 200 mL $CH_2Cl_2$, transferred to a separatory funnel, and washed three times with water. The $CH_2Cl_2$ from the bottom layer is evaporated and the solids are dried in a vacuum oven.

Part C: Urethane Preparation

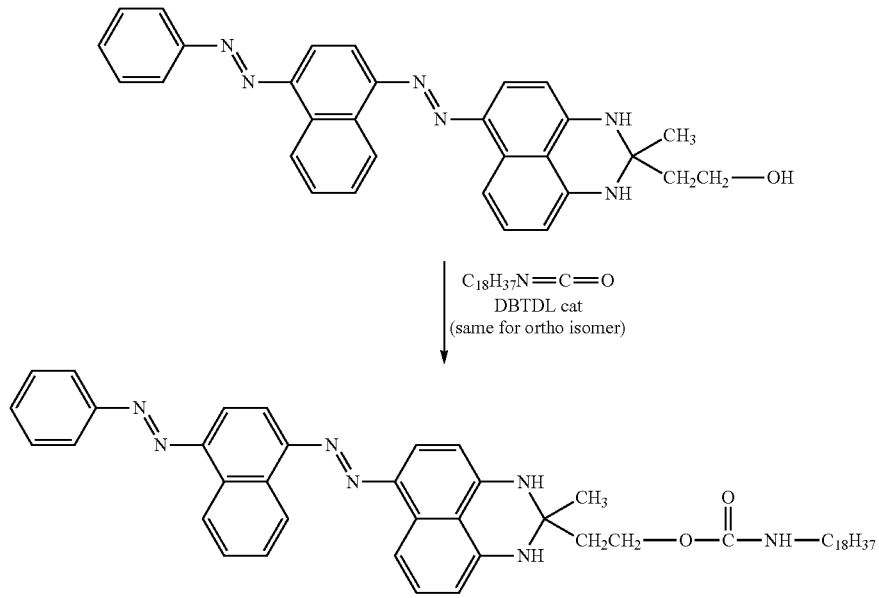

To a 250 mL 1-necked round bottom flask equipped with a TEFLON coated stir magnet, condenser, and 130° C. oil bath is charged 150 g toluene (obtained from J.T. Baker Chemical Co.), 10.0 g of the hydroxyethyl pyrimidine bis-azo dye from Part B above, and 6.1 g octadecyl isocyanate (Aldrich Chemical Co.). The reaction mixture is stirred while placed in the oil bath and 2 drops of dibutyltindilaurate (catalyst) is added. The reaction flask is refluxed for 6 h. A sample is removed and an FTIR spectrum run to follow the disappearance of the isocyanate peak (found at about 2230 cm$^{-1}$). When no isocyanate peak is observed, the toluene is distilled off, leaving a waxy molten sold. The molten solid product is decanted into an aluminum tin and allowed to solidify.

Part D: Ester Preparation

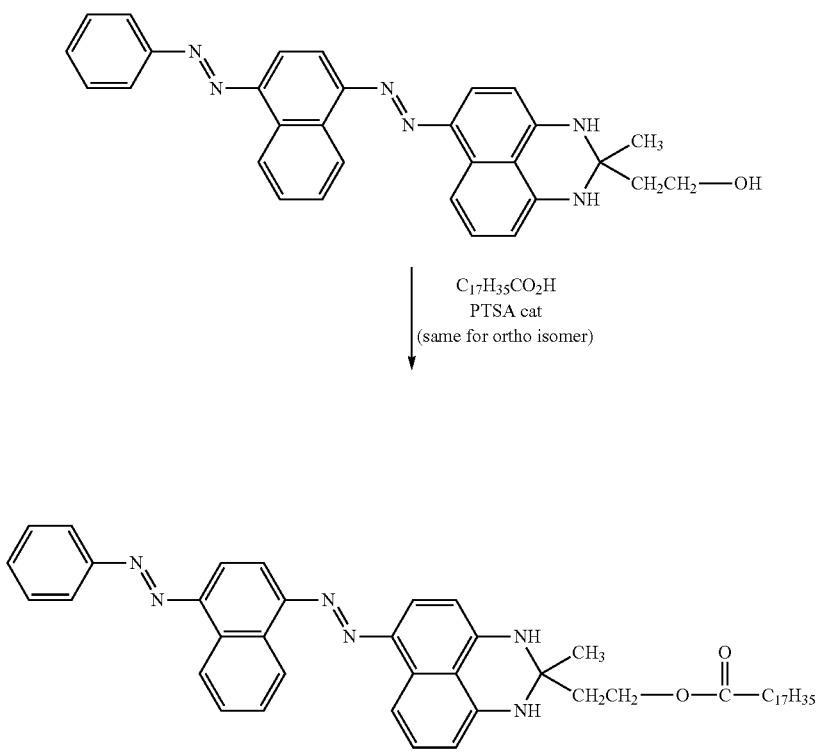

To a 250 mL 1-necked round-bottom flask equipped with a TEFLON coated stir magnet, condenser with Dean-Stark trap, and 150° C. oil bath is charged 150 g toluene, 10.0 g of the hydroxyethyl pyrimidine from Part B above, and 6.0 g octadecanoic acid (Aldrich Chemical Co). The reaction mixture is stirred and placed in the oil bath and a spatula tip of p-toluene sulfonic acid (catalyst) is added. The reaction flask is refluxed for 16 h. A sample is removed and an FTIR spectrum run to follow the appearance of the carbonyl peak (found at about 1700 cm$^{-1}$). When the reaction is complete, the toluene is distilled off leaving a waxy molten sold. The molten solid product is decanted into an aluminum tin and allowed to solidify.

Example IV

Part A: Preparation of 2,3-dihydro-2,2-carboxyethylperimidine

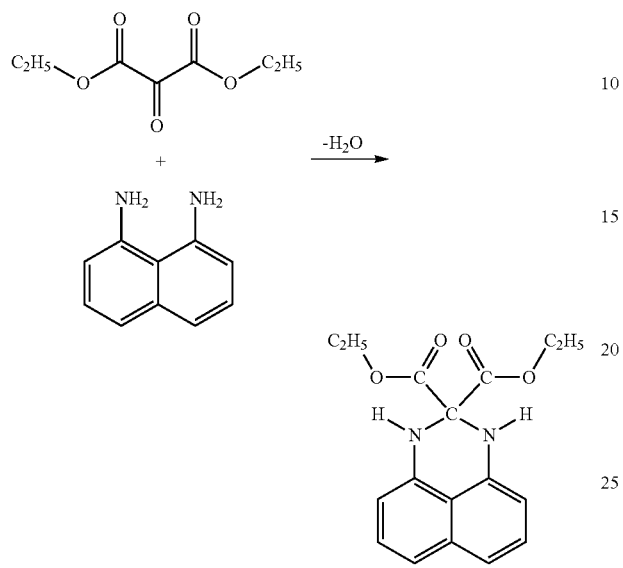

To a 250 mL 1-neck round-bottom flask equipped with a TEFLON-coated stir magnet and condenser is added 17.4 g diethyl mesoxalate, 15.8 g 1,8-diaminonaphthalene, and 125 mL toluene. The reaction vessel is placed in a silicone oil bath at 70° C. and stirring is initiated. After about 3 h a sample is taken and TLC (normal phase silica with 90/10 MeOH/toluene as the mobile phase) is then run on the reaction product to determine that no starting reactants remain. When the reaction is complete, the toluene is distilled off leaving a waxy molten sold. The molten solid is decanted into an aluminum tin and allowed to solidify.

Part B: Preparation of 2,3-dihydro-2,2-biscarboxyunilin(700)perimidine

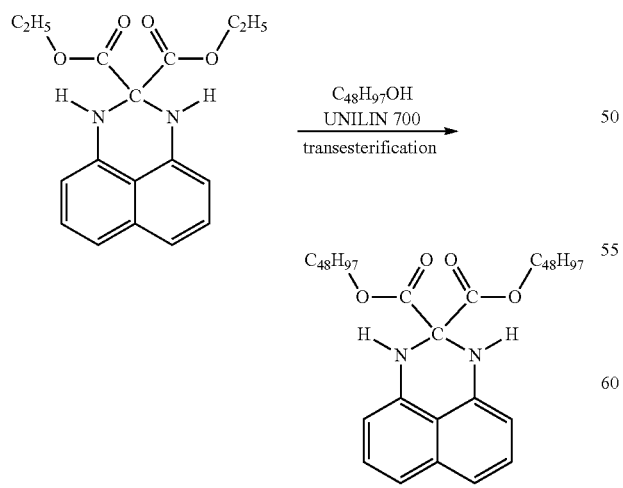

To a 500 mL 1-neck round-bottom flask equipped with a TEFLON coated stir magnet and condenser with Dean-Stark trap are added 31.4 g 2,3-dihydro-2,2-carboxyethylperimidine (as prepared in Part A of this Example), 54 g octadecylamine (Aldrich Chemical Co.), and 250 mL toluene. The flask is placed in a 150° C. oil bath and refluxed until TLC (normal phase silica with 90/10 MeOH/toluene as the mobile phase) indicates no starting reactant remains. When the reaction is completed, the toluene is distilled off leaving a waxy molten sold. The molten solid is poured into an aluminum tin and allowed to solidify.

Part C: Dye Preparation

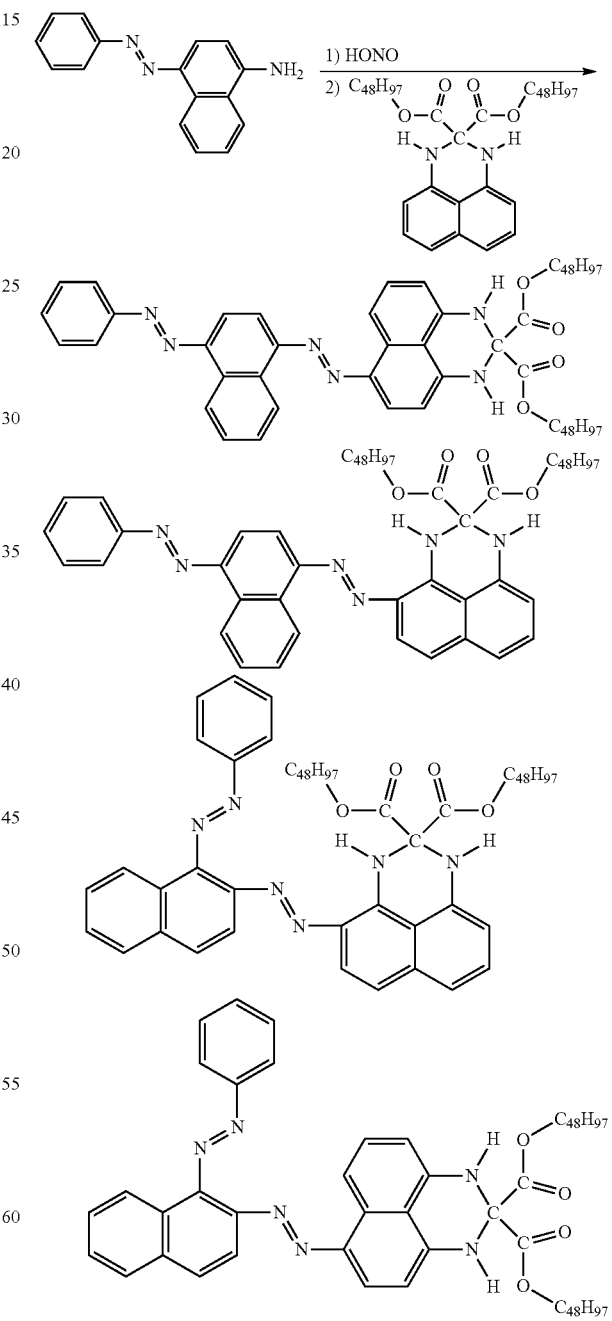

To a 250 mL beaker equipped with TEFLON coated stir magnet is charged 130 g of a mixture of 5 parts acetic acid and 1 part propionic acid, 1.74 g concentrated HCl, and 5 g 4-phenylazo-1-naphthylamine HCl. The reaction mixture is stirred at room temperature for 20 min. The contents turn purple and the solid does not totally dissolve. The beaker is then chilled in an ice/salt bath to 0-5° C. More solids come out upon cooling and the contents become thick. With hand stirring, a 1.33 g sodium nitrite/15 mL water solution is added dropwise. No exotherm is observed but the contents turn yellow and all solids dissolve. After one hour of stirring at 0-5° C., the cold diazonium salt solution is slowly poured into the 250 mL beaker containing 34.7 g of the diester containing perimidine coupler prepared as described in Part B of this Example and 90 g tetrahydrofuran. The precipitate formed is collected and dissolved in 200 mL toluene, transferred to a separatory funnel, and washed three times with water. The toluene layer is collected and transferred to a 500 mL round-bottom flask with TEFLON coated magnet and distillation column attached, the toluene distilled off, and the molten black dye collected in aluminum tins and allowed to cool-solidify.

Example V

Part A: Preparation of 2,3-dihydro-2,2-biscarboxystearylamideperimidine

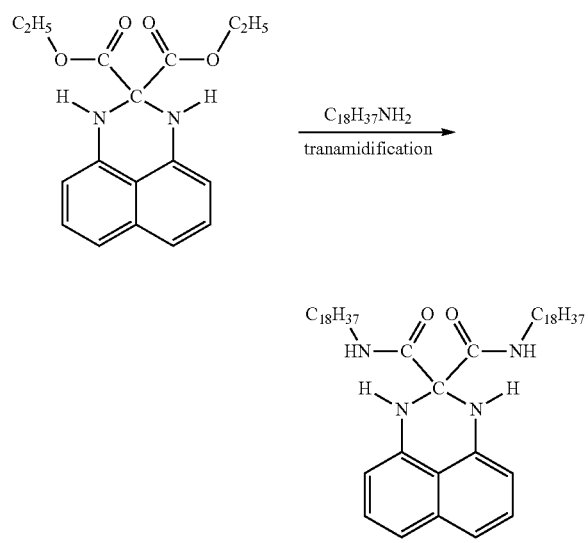

To a 500 mL 1-neck round-bottom flask equipped with a TEFLON coated stir magnet and condenser with Dean-Stark trap is added 31.4 g 2,3-dihydro-2,2-carboxyethylperimidine (prepared as described in Example IV, part A), 54 g octadecylamine (Aldrich Chemical Corp), and 250 mL toluene. The flask is placed in a 150° C. oil bath and refluxed until TLC (normal phase silica with 90/10 MeOH/toluene as the mobile phase) indicates no starting reactant remains. When the reaction is complete, the toluene is distilled off leaving a waxy molten sold. The molten solid is decanted into aluminum tins and allowed to solidify.

Part B: Dye Preparation

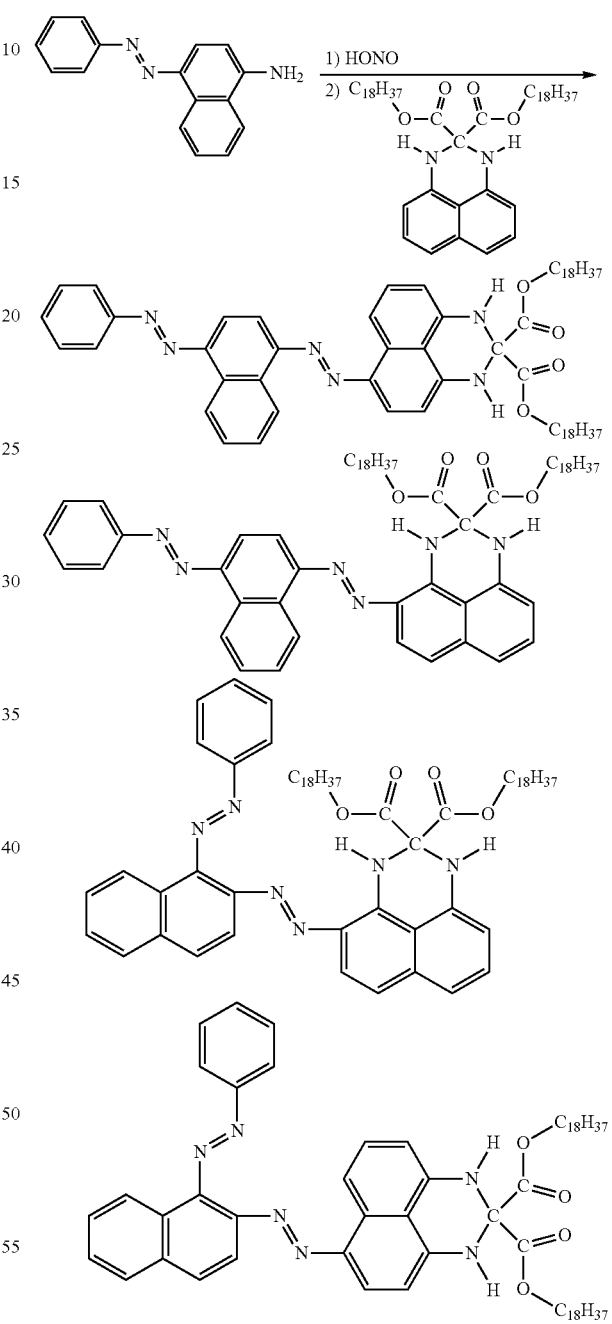

To a 250 mL beaker equipped with TEFLON coated stir magnet is charged 130 g of a mixture of 5 parts acetic acid and 1 part propionic acid, 1.74 g concentrated HCl, and 5 g 4-phenylazo-1-naphthylamine HCl (obtained from Aldrich Chemical Co.). The reaction mixture is stirred at room temperature for 20 min. The contents turn purple and the solid does not totally dissolve. The beaker is then chilled in an ice/salt bath to 0-5° C. More solids come out upon cooling and the contents become thick. With hand stirring, 1.33 g sodium nitrite/15 mL water solution is added dropwise. No exotherm is observed but the contents turn yellow and all solids dissolve. After one hour of stirring at 0-5° C., the cold diazonium salt solution is slowly poured into the 250 mL beaker containing 15.4 g of the diamide-containing perimidine coupler prepared as described in Part A of this Example and 90 g tetrahydrofuran. The precipitate formed is collected and dissolved in 200 mL toluene, transferred to a separatory funnel, and washed three times with water. The toluene layer is collected and transferred to a 500 mL round bottom flask with TEFLON coated magnet and distillation column attached, the toluene distilled off, and the molten black dye collected in aluminum tins and allowed to cool-solidify.

Example VI

Solubility Testing

Solvent Black 3 (NEPTUN BLACK X60, BASF), of the formula

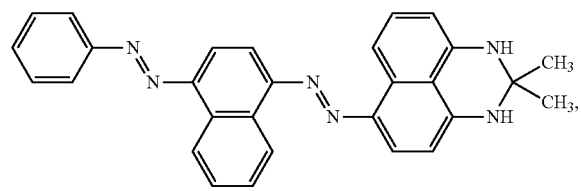 [SMILES: CC1(C)Nc2cccc3c(/N=N/c4ccc(/N=N/c5ccccc5)c5ccccc45)ccc(c23)N1]

molecular weight 456, and the distearyl derivative, a compound as disclosed herein, of the formula

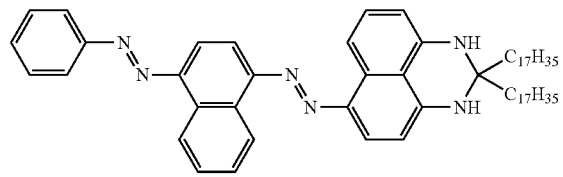

molecular weight 892, were compared for solubility in polyethylene wax, a predominant component in phase change inks. 1 g of the Solvent Black 3 and 2 g of the distearyl derivative (because its molecular weight was about twice that of Solvent Black 3) were each dissolved in 50 g portions of POLYWAX 655 (Baker Petrolite) in 100 mL beakers equipped with magnetic stir bars. The solutions were placed in 120° C. oil baths and allowed to stir for 3 h, followed by cessation of stirring for 1 h, after which the solutions were poured into aluminum tins. At this time, a substantial amount of the Solvent Black 3 appeared on the bottom of its beaker, whereas almost no solids appeared on the bottom of the beaker containing the distearyl derivative.

The two compositions ("inks") were applied to paper using a RK Print-Coat Instruments Ltd. K-proofer. Had all of the solids dissolved in both portions of the polyethylene wax, identical optical densities would have been expected. The composition containing the distearyl derivative, however, yielded images that were considerably darker than those generated with the composition containing Solvent Black 3.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:
1. A compound of the formula

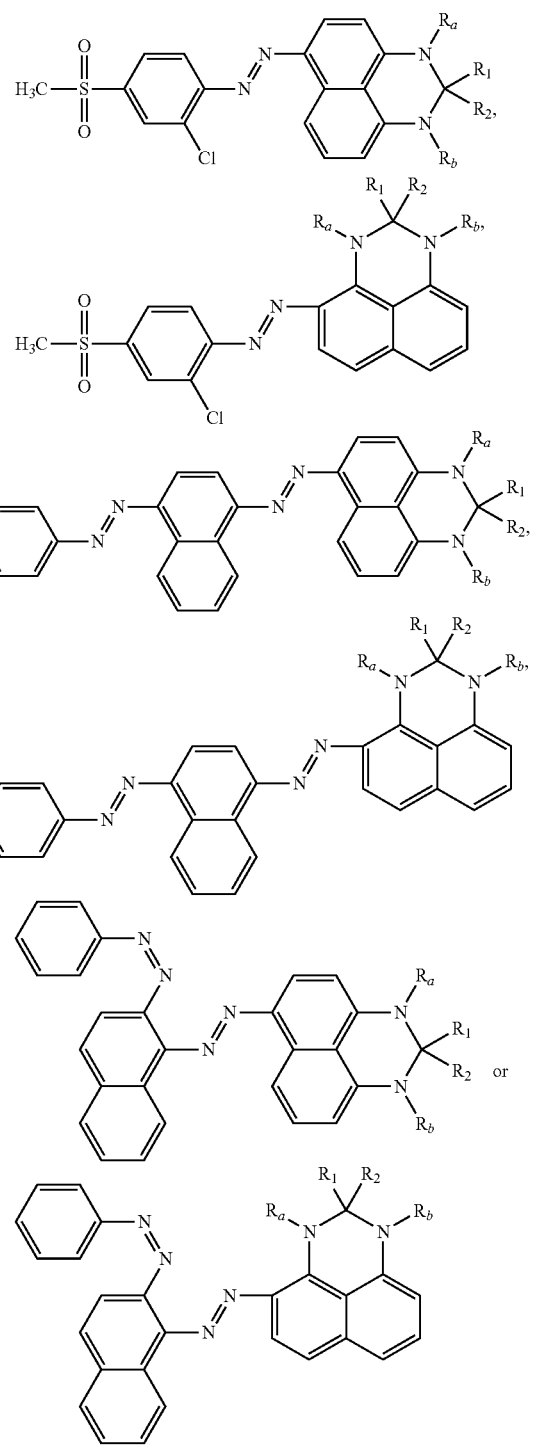

wherein:
(a) Ra and Rb each, independently of the other, are:
  (i) hydrogen;
  (ii) alkyl, including substituted and unsubstituted alkyl, wherein hetero atoms may optionally be present in alkyl;
  (iii) aryl, including substituted and unsubstituted aryl, wherein hetero atoms may optionally be present in aryl;
  (iv) arylalkyl; including substituted and unsubstituted arylalkyl, wherein hetero atoms may optionally be present in either the aryl or the alkyl portion of arylalkyl; or
  (v) alkylaryl, including substituted and unsubstituted alkylaryl, wherein hetero atoms may optionally be present in either the aryl or the alkyl portion of alkylaryl; and
(b) R1 and R2 each, independently of the other, are:
  (i) hydrogen, provided that at least one of R1 and R2 is other than hydrogen;
  (ii) alkyl, including substituted and unsubstituted alkyl, wherein hetero atoms may optionally be present in alkyl, provided that when R1 and R2 are both alkyl at least one of R1 and R2 has at least about 6 carbons;
  (iii) aryl, including substituted and unsubstituted aryl, wherein hetero atoms may optionally be present in aryl;
  (iv) arylalkyl, including substituted and unsubstituted arylalkyl, wherein hetero atoms may optionally be present in either the aryl or the alkyl portion of arylalkyl; or
  (v) alkylaryl, including substituted and unsubstituted alkylaryl, wherein hetero atoms may optionally be present in either the aryl or the alkyl portion of alkylaryl.

2. A compound according to claim 1 of the formula

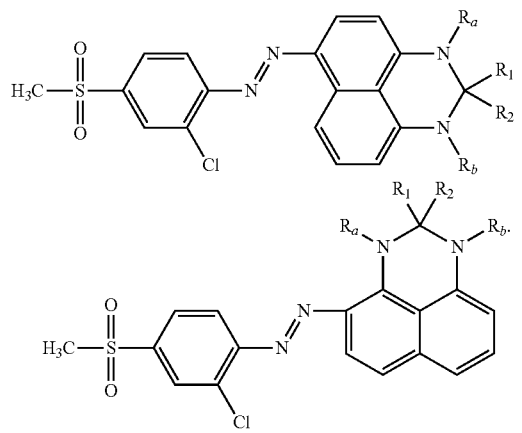

3. A compound according to claim 1 of the formula

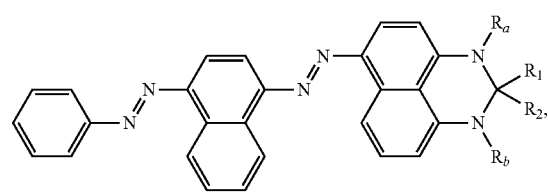

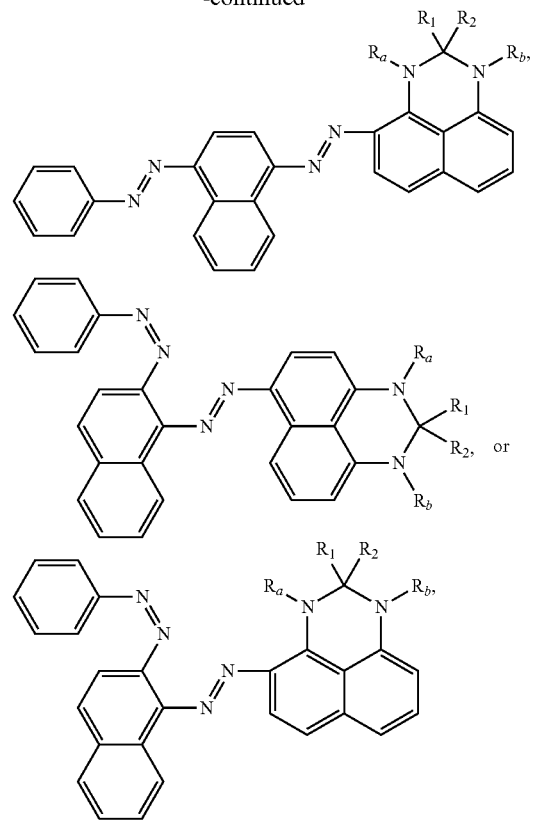

4. A compound according to claim 1 wherein at least one of $R_1$ and $R_2$ is of the formula $-n\text{-}C_nH_{2n+1}$ wherein n is from about 8 to about 100.

5. A compound according to claim 1 wherein at least one of $R_1$ and $R_2$ is of the formula

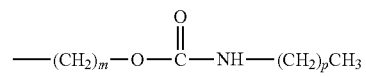

wherein m+p is from about 8 to about 100.

6. A compound according to claim 1 wherein at least one of $R_1$ and $R_2$ is of the formula

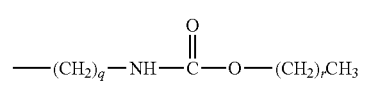

wherein q+r is from about 8 to about 100.

7. A compound according to claim 1 wherein at least one of $R_1$ and $R_2$ is of the formula

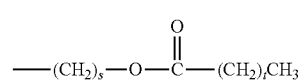

wherein s+t is from about 8 to about 100.

8. A compound according to claim 1 wherein at least one of $R_1$ and $R_2$ is of the formula

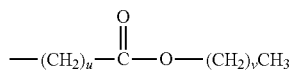

wherein u+v is from about 8 to about 100.

9. A compound according to claim 1 wherein at least one of $R_1$ and $R_2$ is of the formula

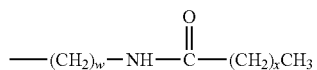

wherein w+x is from about 8 to about 100.

10. A compound according to claim 1 wherein at least one of $R_1$ and $R_2$ is of the formula

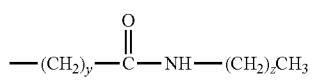

wherein y+z is from about 8 to about 100.

11. A compound according to claim 1 wherein at least one of $R_1$ and $R_2$ is of the formula

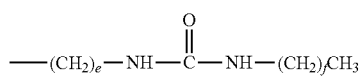

wherein e+f is from about 8 to about 100.

12. A compound according to claim 1 wherein at least one of $R_1$ and $R_2$ has at least about 12 carbons.

13. A compound according to claim 1 wherein $R_6$ and $R_7$ are joined to form an aromatic ring.

14. A compound of the formula

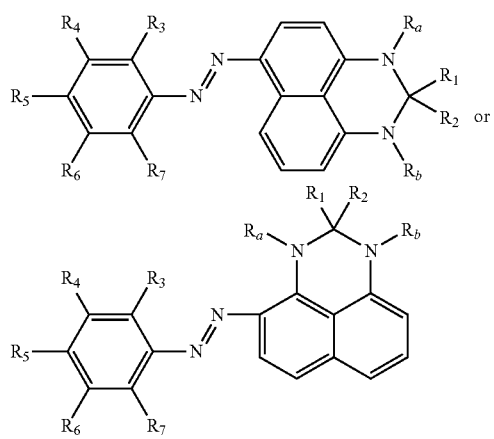

wherein:
(a) $R_a$ and $R_b$ each, independently of the other, are:
 (i) hydrogen;
 (ii) alkyl, including substituted and unsubstituted alkyl, wherein hetero atoms may optionally be present in alkyl, having from about 1 to about 100 carbons;
 (iii) aryl, including substituted and unsubstituted aryl, wherein hetero atoms way optionally be present in aryl, having from about 4 to about 24 carbons;
 (iv) arylalkyl, including substituted and unsubstituted arylalkyl, wherein hetero atoms may optionally be present in either the aryl or the alkyl portion of arylalkyl, having from about 5 to about 100 carbons; or
 (v) alkylaryl, including substituted and unsubstituted alkylaryl, wherein hetero atoms may optionally be present in either the aryl or the alkyl portion of alkylaryl, having from about 5 to about 100 carbons;

(b) at least one of $R_1$ and $R_2$ is:
 (a)

wherein n is from about 8 to about 100;
 (b)

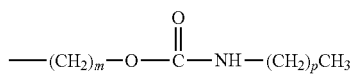

wherein m+p is from about 8 to about 100;
 (c)

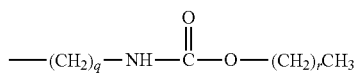

wherein q+r is from about 8 to about 100;
 (d)

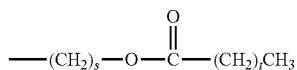

wherein s+t is from about 8 to about 100;
 (e)

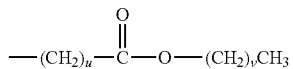

wherein u+v is from about 8 to about 100;
 (f)

wherein w+x is from about 8 to about 100;
 (g)

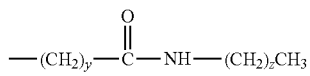

wherein y+z is from about 8 to about 100;

(h)

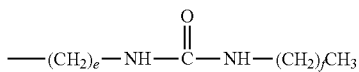

wherein e+f is from about 8 to about 100; or
  (i) a combination thereof; and
(c) $R_3$, $R_4$, $R_5$, $R_6$, and $R_7$ each, independently of the others, are:
  (1) alkyl, including substituted and unsubstituted alkyl, wherein hetero atoms may optionally be present in alkyl, having from about 1 to about 100 carbons;
  (2) aryl, including substituted and unsubstituted aryl, wherein hetero atoms may optionally be present in aryl, having from about 4 to about 24 carbons;
  (3) arylalkyl, including substituted and unsubstituted arylalkyl, wherein hetero atoms may optionally be present in either the aryl or the alkyl portion of arylalkyl, having from about 5 to about 100 carbons;
  (4) alkylaryl, including substituted and unsubstituted alkylaryl, wherein hetero atoms may optionally be present in either the aryl or the alkyl portion of alkylaryl, having from about 5 to about 100 carbons;
  (5) a substituent other than hydrogen, alkyl, aryl, arylalkyl, or alkylaryl which is halogen, hydroxy, amino, imine, ammonium, pyridine, pyridinium, ether, aldehyde, ketone, ester, amide, carbonyl, thiocarbonyl, sulfate, sulfonate, sulfonic acid, sulfide, sulfoxide, phosphine, phosphonium, phosphate, phosphonate, nitrile, mercapto, nitro, nitroso, sulfone, acyl, acid anhydride, azide, azo, cyanato, isocyanato, thiocyanato, isothiocyanato, carboxylate, carboxylic acid, carbamate, carbamide, silyl, siloxyl, silane, or a combination thereof; or
  (6) hydrogen;
wherein two or more of $R_3$, $R_4$, $R_5$, $R_6$, and $R_7$ can be joined together to form a ring and wherein two or three of $R_3$, $R_4$, $R_5$, $R_6$, and $R_7$ are hydrogen.

15. A compound of the formula

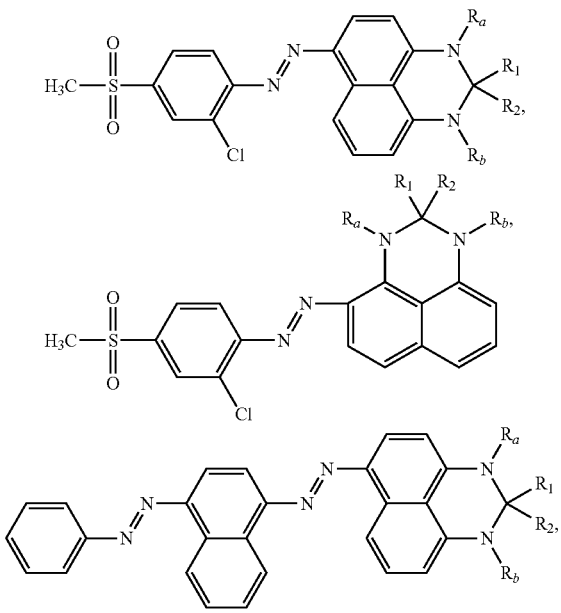

-continued

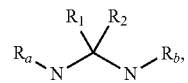

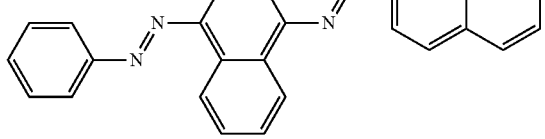

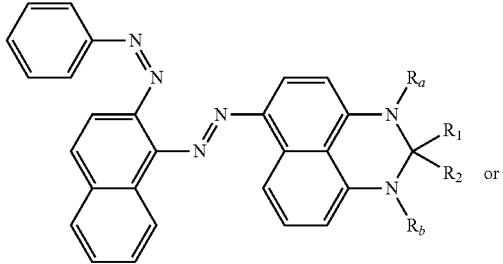

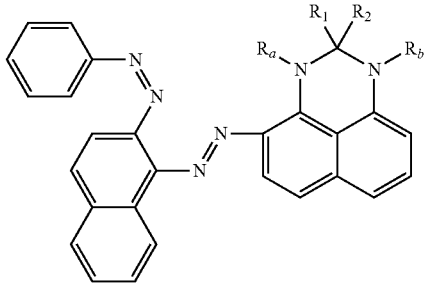

wherein:
  (a) Ra and Rb each, independently of the other, are:
    (i) hydrogen;
    (ii) alkyl, including substituted and unsubstituted alkyl, wherein hetero atoms may optionally be present in alkyl, having from about 1 to about 100 carbons;
    (iii) aryl, including substituted and unsubstituted aryl, wherein hetero atoms may optionally be present in aryl, having from about 6 to about 12 carbons;
    (iv) arylalkyl, including substituted and unsubstituted arylalkyl, wherein hetero atoms may optionally be present in either the aryl or the alkyl portion of arylalkyl, having, from about 7 to about 100 carbons; or
    (v) alkylaryl, including substituted and unsubstituted alkylaryl, wherein hetero atoms may optionally be present in either the aryl or the alkyl portion of alkylaryl, having from about 7 to about 100 carbons; and
  (b) R1 and R2 each, independently of the other, are:
    (i) hydrogen, provided that at least one of R1 and R2 is other than hydrogen;
    (ii) alkyl: including substituted and unsubstituted alkyl, wherein hetero atoms may optionally be present in alkyl, having from about 1 to about 100 carbons, provided that when R1 and R2 are both alkyl at least one of R1 and R2 has at least about 6 carbons;
    (iii) aryl, including substituted and unsubstituted aryl, wherein hetero atoms may optionally be present in aryl, having from about 6 to about 12 carbons;
    (iv) arylalkyl, including substituted and unsubstituted arylalkyl, wherein hetero atoms may optionally be present in either the aryl or the alkyl portion of arylalkyl, having from about 7 to about 100 carbons; or (v) alkylaryl, including substituted and unsubstituted alkylaryl,
wherein hetero atoms may optionally be present in either the aryl or the alkyl portion of alkylaryl, having from about 7 to about 100 carbons.
16. A compound according to claim 15 wherein the compound is of the formula
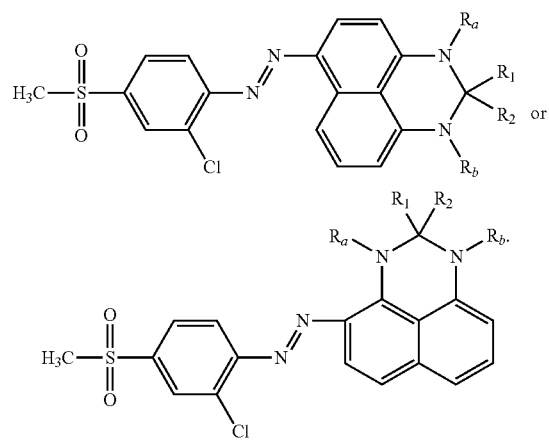
17. A compound according to claim 15 wherein the compound is of the formula
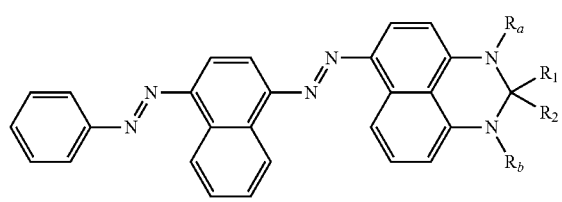
-continued
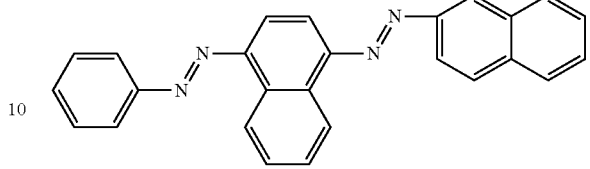
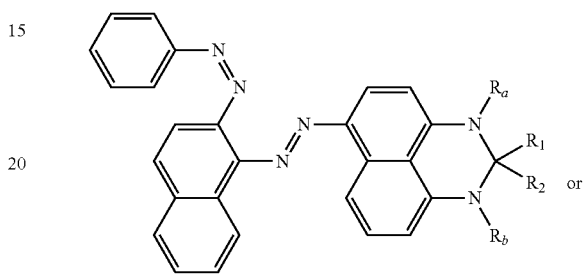
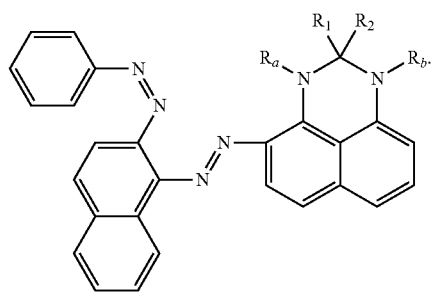
* * * * *